April 25, 1967 W. R. ALLEN 3,315,966

TOY PHONOGRAPH DEVICE

Filed Aug. 17, 1964 2 Sheets-Sheet 1

INVENTOR
WILLIAM R. ALLEN,

By Harold J. LeVisconte
ATTORNEY.

WILLIAM R. ALLEN,
INVENTOR.

By Harold J. [illegible]
ATTORNEY.

United States Patent Office 3,315,966
Patented Apr. 25, 1967

3,315,966

TOY PHONOGRAPH DEVICE

William R. Allen, 2029 N. Kenmore St., Los Angeles, Calif. 90027

Filed Aug. 17, 1964, Ser. No. 390,102
7 Claims. (Cl. 274—1)

This invention relates generally to phonographic devices and more particularly to a phonographic toy.

The primary requisites of a phonographic device suitable for use as a toy are uniqueness of appearance and action, simplicity of construction and operation, economy of manufacture, ruggedness, as well as satisfactory reliability and quality of reproduction. This invention provides a phonographic toy which is uniquely constructed to satisfy these requirements. Generally speaking, the requirements are satisfied in this invention by providing a phonographic toy having three primary features of novelty. One feature of the invention, for example, is concerned with a unique mounting for the turntable, stylus, and sound reproducing diaphragm of the phonographic toy, whereby a record disc on the turntable may be easily replaced and engaged with the stylus. According to this feature of the invention, the turntable is mounted within one part of a two-piece hollow housing and the stylus and diaphragm are mounted within the other housing part in such manner that the record disc is exposed for replacement by separating the housing parts, and the stylus is automatically engaged with the record disc by bringing the housing parts together. Preferably, the two housing parts are hingedly joined so that they may be conveniently separated and reclosed. Also, the housing is preferably shaped to form a fanciful figure pleasing to children, such as an animal.

According to a second feature of the invention, the turntable is driven by an air turbine contained within the housing. The housing is equipped with an external mouthpiece through which a child may blow to propel the turbine and thereby rotate a record disc on the turntable relative to the stylus.

According to a third feature of the invention, the stylus and sound reproducing diaphragm of the toy are integrally joined and movably mounted on the respective housing part in such manner that the stylus is located to engage in the start of the record groove, when the housing parts are closed, by simply tilting the housing.

A general object of the invention, therefore, is to provide an air powered phonographic toy of the character described.

Another object of the invention is to provide a phonographic toy of the character described which satisfies all of the primary requisities discussed earlier, to wit, uniqueness of appearance and action, simplicity of construction, economy of manufacture, ruggedness, and ease of operation, as well as satisfactory reliability and quality of reproduction.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings.

Figure 1:
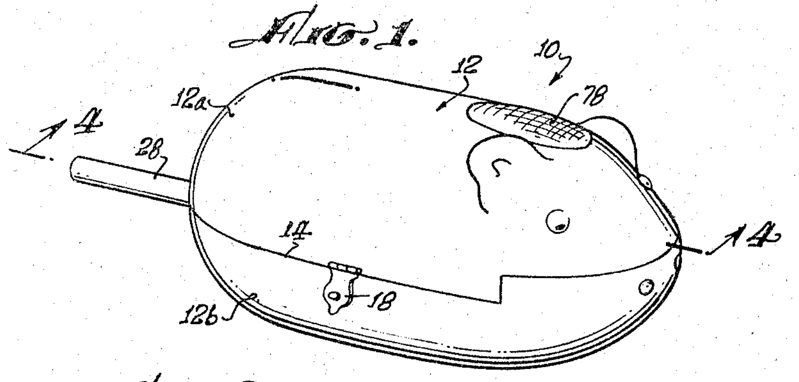
FIG. 1 is a perspective view of the present toy, showing the housing of the toy in its normally closed condition.
Figure 2:
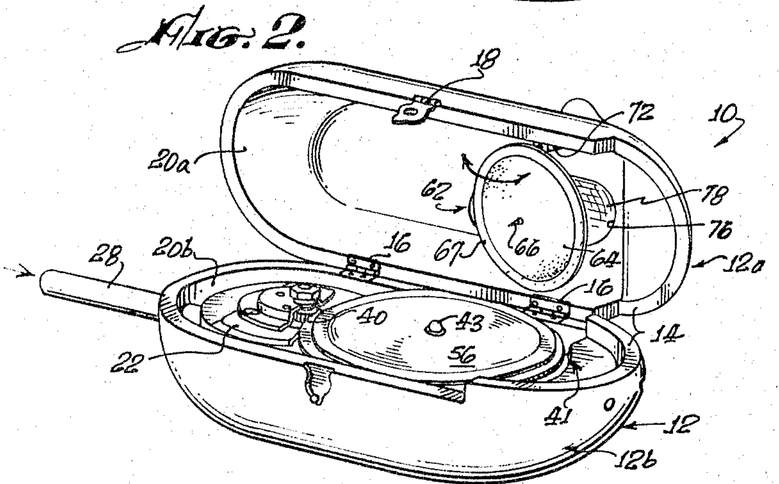
FIG. 2 is a view similar to FIG. 1 showing the housing opened to permit replacement of the record disc.
Figure 3:
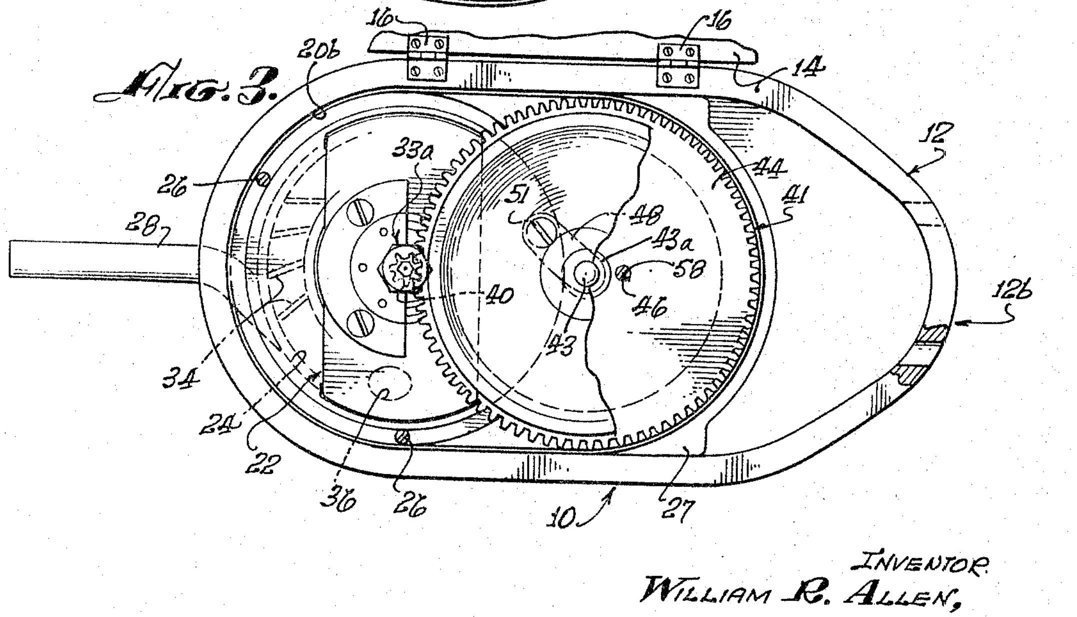
FIG. 3 is an enlarged plan view of the lower half of the housing with parts broken away and sectioned for the sake of clarity.

The phonographic toy 10 illustrated in these drawings comprises an enclosure or housing 12. As mentioned earlier, it is the preferred practice of the invention to provide the housing with a fanciful shape which is pleasing to children. For example, the housing might be made in the form of an animal, as illustrated in FIG. 1. Housing 12 is divided into upper and lower parts 12*a* and 12*b* along a parting plane 14. The two parts 12*a* and 12*b* of the housing are joined along one side by hinges 16 to permit the housing to be opened, as in FIG. 2, and closed, as in FIG. 1. A latch 18 releasably retains the housing in its closed condition.

Within the housing parts 12*a* and 12*b* are cavities 20*a* and 20*b*, respectively, whereby the housing 12 is hollow. Mounted within the cavity 20*b* in the lower housing part 12*b* is an air turbine 22. This turbine includes a cylindrical chamber 24 which is secured, by screws 26, to a plate 27 fixed in the lower housing part by a screw 27' which extends through the housing and the plate 27 and threadedly engages a sleeve element 27'' seated on the upper face of the plate 27 and, in addition to another function to be later described, acts as a nut element on the screw 27' serving to clamp the plate to the housing part. A tube 28 is ridigly joined at one end to the cylindrical wall of the chamber 24 and extends to the exterior of the housing 12 through an opening in the lower housing part 12*b*. The exterior end of the tube 28 extends some distance beyond the housing and forms a mouthpiece. Extending through the tube 28 is an air passage 30 which opens generally tangentially to the interior of the chamber 24. A turbine wheel 32 is coaxially mounted, by bearings 33*a*, 33*b*, for rotation within the chamber 24. The turbine wheel has radial vanes 34. As will be explained in greater detail shortly, a child using the present phonographic toy blows through the tube, or mouthpiece 28. The resulting air flow through the passage 30 in the mouthpiece enters the turbine chamber 24 tangentially and impinges the vanes 34 of the turbine wheel 32, thereby propelling the latter in rotation. The air exhausts from the chamber 24 through a passage 36 opening to the exterior of the housing 12.

The turbine wheel 32 has a central shaft 38 which is rotatably supported at its ends in bearings 33*a*, 33*b*. Rigid on the upper end of this shaft, externally of the chamber 24, is a pinion 40.

Within the cavity 20*b* in the lower housing part 12*b*, adjacent the turbine 22, is a turntable 41. This turntable comprises a disc 42 having a rigid coaxial shaft 43, the upper and lower extremities of which are reduced, as shown, to form a hub 43*a* above the disc. Press fitted on the hub 43*a* is a large gear 44 with an eccentric socket 46. Below the turntable 41 is an arm 48 rigidly mounting an upstanding pin 50 which extends through and is journaled in a bore extending coaxially into the lower end of shaft 43. Arm 48 is secured, by a screw 51, to the upper end of the sleeve 27'' which clamps the plate 27 in position in the lower housing part 12*b*.

Turntable gear 44 meshes with the pinion 40 on the turbine wheel 32. Rotation of the turbine wheel, therefore, is effective to drive the turntable 41 in rotation. Since the turntable gear is substantially larger in diameter than the pinion, the turntable rotates at a substantially lower speed than the turbine wheel. It will be observed that the arm 48, which rotatably supports the turntable 41, is so angularly disposed that rotation of the arm about the axis of the screw 51, when the latter is loosened, is effective to move the gear 44 generally radially toward and away from the pinion 40. This angular adjustment of the arm 48 permits the position of the gear to be initially adjusted to achieve proper meshing engagement of the gear with the pinion. After the gear is properly located, the screw 51 is tightened to retain the gear in fixed position. Such an adjustable mounting for the turntable gear 44 is highly advantageous since it eliminates the necessity of accurately locating the rotation axis of the gear relative to the rotation axis of the turbine wheel 32, as would be required if the turntable gear were rotatably supported in fixed bearings on housing 12.

Removably fitted over the upper extremity of the turntable shaft 43 is a record disc 56 having an eccentric boss 58 engaging in the eccentric socket 46 in the turntable gear 44 to provide a drive coupling between the turntable gear and the record disc, whereby the latter rotates with the gear.

At this point, therefore, it is apparent that when air is blown through the mouthpiece 28 to drive the turbine wheel 32 in rotation, the turntable 41, and thereby the record disc 56, are driven in rotation. The record speed, of course, will depend upon the velocity at which air is blown through the mouthpiece. It is desirable, however, to provide the turntable drive with a flywheel effect in order to prevent undesirable fluctuations in the turntable speed. To this end, the turbine wheel 32 may be constructed to have sufficient mass to provide such a flywheel effect.

Mounted on the upper part 12*a* of the housing 12 is the sound reproducing unit 62 of the toy. This reproducing unit comprises an acoustic diaphragm 64, to the center of which is attached a stylus or needle 66. About the edge of the diaphragm is a supporting ring 67.

Figure 4:
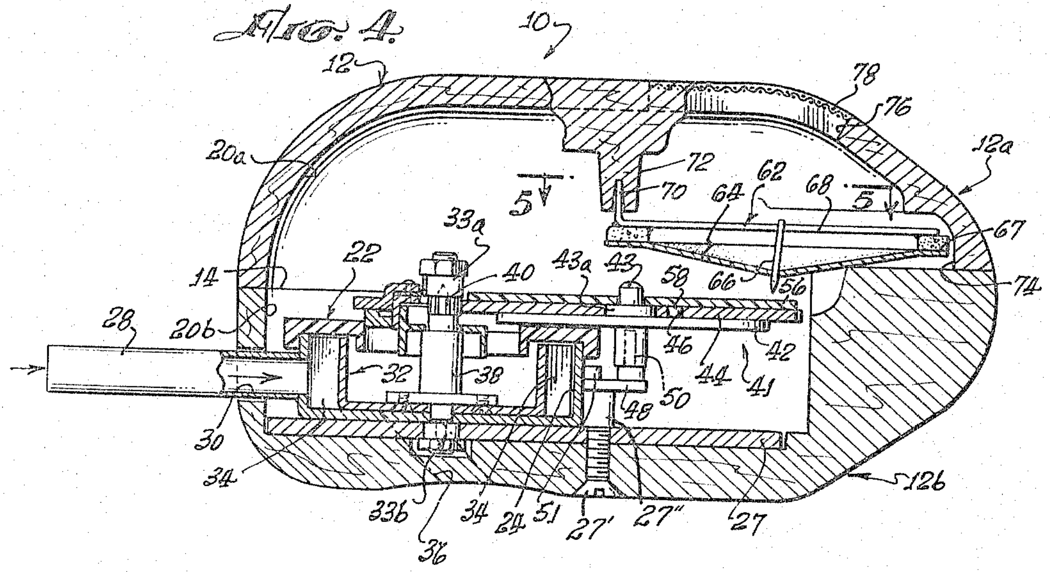
FIG. 4 is an enlarged longitudinal section through the toy with the housing closed.
Figure 5:
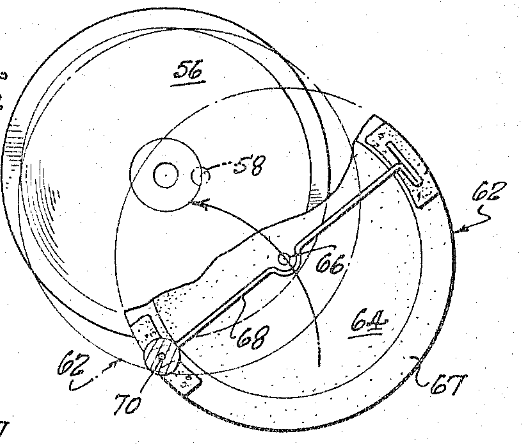
FIG. 5 is a section taken on line 5—5 in FIG. 4.
Figure 6:
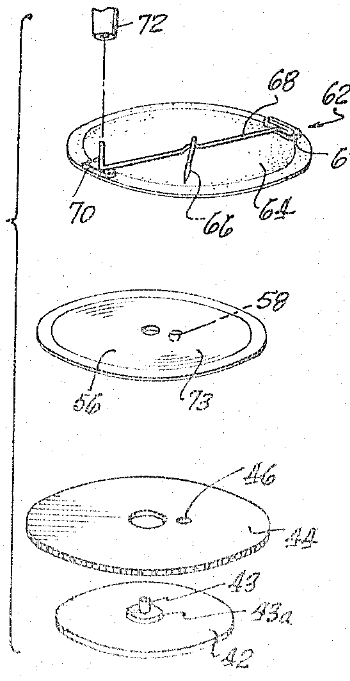
FIG. 6 is an exploded perspective view of the turntable, record disc and accoustic diaphragm of the toy.

Fixed to the upper surface of the supporting ring 67 is a wire arm 68 terminating in a right angular bent end or pivot 70. Pivot 70 is rotatably supported in a bearing 72 on the upper housing part 12*a* for rotation about an axis parallel to and offset from the turntable axis, when the housing parts are in their closed positions of FIGS. 1 and 4. The arm pivot 70 may be axially retained in the bearing 72 in any convenient way. The axis of the bearing 72 is laterally displaced from the axis of the turntable 41 so that rotation of the sound reproducing unit 62 about the axis of the bearing is effective to move the stylus 66 generally radially across the record disc 56 when the housing parts are in their closed positions. It is apparent, therefore, that if the stylus 66 is initially engaged in the groove 73 of the record disc 56, the stylus will track in the groove and be moved generally radially across the record disc, when the latter is driven in rotation by the turbine 22.

When rotating the record disc 56 relative to the stylus 66, to reproduce the sound recording on the record, it is possible that the stylus might move from the center of the record disc toward the outside of the disc or from the outside of the record disc toward the center of the disc. It is preferred, however, to have the stylus move from the outside of the disc toward the center of the disc. In this case, it is necessary to locate the stylus in the outer starting end of the record groove 73 each time the record is to be played. According to the invention, this is accomplished by tilting the housing 12 in such a way that the reproducing unit 62 is urged, by the force of gravity, toward the outer edge of the record disc 56. In the illustrated phonographic toy, this would involve lowering the end of the housing remote from the mouthpiece 28. Within the latter end of the housing is a stop shoulder 74 which limits swinging movement of the reproducing unit 62 toward the outer edge of the record disc to a position in which the stylus 66 is aligned with the outer end of the record groove.

Operation of the illustrated toy is believed to be obvious from the preceding description. Thus, a record disc 56 is placed on the turntable 41 by opening the housing 12, as in FIG. 2, and placing the record disc on the turntable gear 44 in such manner that the central hole in the disc engages over the turntable shaft 43 and the record boss 58 engages in the gear socket 46. Before or after closing and latching the housing, the forward end of the housing is tilted downwardly to cause the sound reproducing unit 62 to swing against the stop shoulder 74 under the action of gravity. Finally, the housing is returned to its normal horizontal position of FIG. 4, whereupon the weight of the unit 62 causes the stylus 66 to enter the outer end of the record groove.

Turntable 41 is driven in rotation, thereby to rotate the record disc 56 relative to the stylus 66, by blowing through the mouthpiece 28. As the record disc rotates, the record groove travels past the stylus, thereby imparting vibrations to the acoustic diaphragm 64 to reproduce the sound recording on the record. In order to provide the sound reproduction with maximum volume and quality on the outside of the housing 12, it is preferred to provide the housing with an opening 76 directly over the acoustic diaphragm 64. For the sake of appearance, this opening may contain a screen 78, or the like, which may be painted the same color as the exterior of the housing.

While in the foregoing specification there has been disclosed a presently preferred embodiment of the invention, the invention is not to be deemed to be limited to the precise details of construction thus disclosed by way of example, and it will be understood that the invention includes as well all such changes and modifications in the parts and in the construction, combination and arrangement of parts as shall come within the purview of the appended claims.

I claim:

1. In a phonographic device, the combination comprising:
   - a hollow housing including a lower portion and an upper portion hinged to said lower portion for access to the interior of said housing,
   - a supporting plate disposed in the bottom of said lower portion,
   - a record supporting turntable disposed within said housing above said supporting plate,
   - a turbine mounted on said supporting plate and including a turbine wheel drivably coupled to said turntable for driving the latter in rotation,
   - a journal means mounted on said supporting plate affording an axis of rotation for said turntable,
   - means simultaneously securing said journal means on said supporting plate and securing said supporting plate in said lower housing, and
   - a mouthpiece extending from said turbine to the exterior of said housing through which air may be blown to effect rotation of said turbine wheel.

2. A phonographic device as claimed in claim 1 in which said turntable includes a relatively large diameter gear rotatable about a vertical axis with the upper side face of the gear serving as the record supporting surface and having means eccentrically disposed with respect to the axis of said gear on said record supporting surface for drivably engaging a record disk on said supper face and having means complementary to said eccentrically disposed means and said large diameter gear further having a central hub element projecting beyond said record supporting face for engagement with the axial hole of a record, and in which
   - said turbine includes a rotary driven shaft carrying said turbine wheel, and
   - a pinion on said shaft meshing with said large diameter gear.

3. In a phonographic device, the combination comprising:
   - a support,
   - a motor on said support including a rotary driven shaft,
   - a pinion on said shaft,
   - an arm pivotally mounted on said support for rotation about an axis parallel to said shaft,
   - a pin on the end of said arm parallel to said axes, a turntable rotatably mounted on said pin including a relatively large diameter gear having one face thereof affording a supporting surface for a record disk, a record disk having a boss projecting from the turntable engaging face thereof and a central hub projecting beyond said one face of said gear for engagement in the central hole in said record.

a socket in said turntable face engaged by said boss, said arm being angularly adjustable to swing said gear toward and away from said pinion, thereby to locate said gear in proper meshing engagement with said pinion, and means for securing said arm in fixed position.

4. The subject matter of claim 3 wherein:

said motor is a turbine including a turbine wheel coupled to said rotary driven shaft, and a mouthpiece extending from said turbine through which air may be blown to drive said turbine wheel in rotation.

5. A phonographic device as claimed in claim 3 and including:

a supporting means on said upper portion of said housing, an acoustic diaphragm carried by said supporting means and so disposed that when said housing is closed, said diaphragm is positioned over and in a plane substantially parallel to the plane of said turntable, a record groove engaging stylus centrally fixed to the side of said diaphragm facing said turntable, and means pivotally mounting said diaphragm on said upper portion of said housing for oscillation about an axis parallel to and laterally offset from said stylus and the axis of said turntable in such manner that said stylus travels generally radially across said turntable during rotation of said diaphragm about its pivot axis.

6. The subject matter of claim 5 including:

a record disk on said turntable having a sound reproducing groove, said pivotal mounting of said diaphragm, upon tilting of said housing, being effective to allow said stylus and said diaphragm to move radially across said record disk toward the outer end of said groove, and stop shoulder means on said support engageable with said diaphragm for locating said stylus over said one end of said groove.

7. A phonographic device comprising:

a hollow housing composed of two separable housing parts, means hingedly connecting said housing parts, whereby said parts are rotatable between open and closed positions, said housing having an internal cavity, a turntable rotatably mounted on one of said housing parts within said cavity, a turbine mounted on said one housing part within said cavity, said turbine including a turbine wheel, means drivably coupling said turbine wheel and said turntable, whereby the latter is driven in rotation by said turbine wheel, a mouthpiece extending from said turbine to the outside of said housing through which air may be blown to propel said turbine wheel in rotation, said turntable being adapted to support a record disk having a sound reproducing groove, a sound reproducing unit including an acoustic diaphragm, and a stylus projecting axially from the center of said diaphragm, means pivotally mounted said diaphragm on the other housing part within said housing cavity for rotation about an axis normal to the plane of the diaphragm and parallel to and laterally spaced from the axis of said turntable and said stylus, whereby said stylus is movable generally radially across said turntable during rotation of said diaphragm about its pivot axis with said housing parts in said closed positions, said housing being adapted to be tilted from a normal horizontal position to cause said stylus to swing in a direction toward the outer edge of said turntable, and stop shoulder means on said housing within said cavity for limiting swinging movement of said stylus in said direction.

References Cited by the Examiner

UNITED STATES PATENTS

| | | | |
|---|---|---|---|
| 1,411,952 | 4/1922 | Dupell | 46—44 |
| 1,512,283 | 10/1924 | Fritsche | 274—1 |
| 1,979,067 | 10/1934 | Franklin | 274—1 |
| 2,552,757 | 5/1951 | Adler | 274—2 |

FOREIGN PATENTS

| | | |
|---|---|---|
| 540,292 | 4/1957 | Canada. |

NORTON ANSHER, *Primary Examiner.*

C. B. PRICE, J. F. PETERS, *Assistant Examiners.*